3,591,687
BILE ACIDS AND DERIVATIVES THEREOF AS
ANORECTIC AGENTS
George A. Bray, 654 Wellesley St.,
Weston, Mass. 02193
No Drawing. Filed Mar. 13, 1968, Ser. No. 712,583
Int. Cl. A61k 17/00
U.S. Cl. 424—238                2 Claims

ABSTRACT OF THE DISCLOSURE

Certain unconjugated bile acids as well as certain conjugates thereof, at sufficient dose levels, suppress the appetite in man and the food intake of experimental animals. By direct reduction of caloric intake, they provide a variable and reversible process for the treatment of obesity. Among these acids are those synthesized by the human liver. No toxic or otherwise untoward effect on the central nervous system, on renal, hepatic or hematological functions, or on other body organs has been noted during their use.

BACKGROUND OF THE INVENTION

The invention described herein was made in the course of work under a grant or award from the Department of Health, Education and Welfare.

The field of this invention generally comprises anorectic agents, that is, agents administered primarily or exclusively for suppressing the appetite as a means for treatment of obesity. They function primarily by reducing the intake of food, thereby reducing the amount of food available for absorption by the intestine. The mechanisms of the anorexia are imperfectly understood, but treatments relying on these phenomena hold promise because they may be varied either to increase or decrease the desired effects.

Hitherto, attempts at modifying the physiological mechanisms so as to reduce the appetite have generally produced insufficient or merely temporary effects, or have produced toxic or otherwise harmful side effects. Agents that produce stimulation of the central nervous system such as epinephrine, dextro-amphetamine and related phenylalkylamines, reduce the appetite, but the effect has been observed to diminish over a period of time and there are serious side effects in the use of such sympathomimetic amines including habituation and addiction. These effects have not been successfully offset by the administration of barbiturates in conjunction with the anorectic agents.

Other attempts at weight control have involved the use of diuretics and of thyroid hormone extract or its synthetic close relatives. The latter have also been shown to produce toxic effects resulting in nervousness, increased pulse rate and harmfully increased body metabolism.

SUMMARY OF THE INVENTION

This invention consists in administering certain bile acids, in either unconjugated or conjugated forms and either alone or in combinations, to reduce food intake. The most effective bile acids appear to be those having hydroxyl groups at two positions with the most effective results obtained for the 3,7 and 3,12 combinations, having reference to the following general formula.

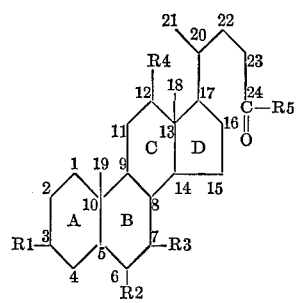

The effectiveness of these bile acids also appears dependent on the presence of the C-24 carboxyl group. Effectiveness has also been found with the taurine and glycine conjugates of the free acids that are effective. In these conjugates the R5 position contains the group

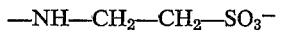

—NH—CH$_2$—CH$_2$—SO$_3^-$ for the taurine and —NH—CH$_2$—COO$^-$ for the glycine.

The anorectic effectiveness of certain free bile acids characterized as above has been demonstrated thus far in humans, and that of the conjugates in experimental animals. Effectiveness depends on the daily oral dose levels, with thresholds for effective lowering of the appetite in humans generally in the range above 800 milligrams. Sustained, continuous treatment at levels above the indicated threshold have demonstrated the continuing effectiveness of this therapy in suppressing appetite in obese individuals.

Bile acids are found in nature predominately as conjugates of taurine and glycine, the free bile acids being found only in small concentrations in some preparations of bile. They are synthesized in the liver from cholesterol and secreted into the gastrointestinal tract where they are involved in the activation of pancreatic lipase and in the absorption of fat. In this process the bile salts are secreted back into the biliary tree by the liver and reutilized repeatedly.

The present therapy does not appreciably involve malabsorption because little effect on the fecal excretion of fat is observed in its use. Little or no effect is noted in the pulse rate and body temperature and in the histology of intestinal mucosa.

DESCRIPTION OF THE PREFERRED EMBODIMENT

The anorectic effect of deoxycholic acid (5β-cholanic acid-3α,12α-diol) [1] in man was expectedly noted in a trial

---

[1] The designations α and β represent substituent positions into and out of the plane represented by the structural formula.

designed to determine whether it would function on malabsorption principles as measured by an increase in the fecal excretion of fat. This function had been previously noted in the use of cholestyramine, an anion exchange resin that binds bile acids and salts and produces steatorrhea.

In this study, each of six obese volunteer outpatients was first instructed in an 1800 calorie high fat diet. Gelatin capsules were prepared, each containing 400 mg. of commercially available deoxycholic acid. The deoxycholic acid was orally administered at the rate of 1200 mg. per day in three divided doses, alternating with placebos at two week intervals over a three-month period. Administration was carried out on a double-blind basis, that is, neither the patients nor the prescribing doctor was informed when the patients were given the bile acid-containing capsules and when they were given the placebos.

By the end of the trial period, four of the six patients had spontaneously reported that one of the pills had suppressed appetite. Examination of the records showed that appetite suppression had coincided with administration of deoxycholic acid. The results are summarized in Table 1.

TABLE 1

| Patient's initials | Sex | Age (yrs.) | Weight (lbs.) | Effect on appetite |
|---|---|---|---|---|
| G. B | M | 21 | 440 | Suppression. |
| C. D | M | 28 | 352 | Do. |
| J. L | F | 30 | 228 | Do. |
| D. L | F | 39 | 347 | Do. |
| A. G | F | 37 | 275 | No effect. |
| G. E | F | 36 | 236 | Do. |

A second double-blind trial was subsequently carried out with four out-patients each receiving 1200 mg. per day of deoxycholic acid, and three of these noted a significant reduction in appetite. Other trials at dose levels of 200 mg. per day and 800 mg. per day have produced no significant lowering of the appetite.

The foregoing trials were followed by a third double-blind trial, designed on a 5 x5 Latin square to determine the anorectic efficacy of four other commercially available bile acids. The agents used were lithocholic acid (5β-cholanic acid-3α-ol), chenodeoxycholic acid (5β-cholanic acid-3α,7α-diol), cholic acid (5β-cholanic acid-3α,7α,12α-triol), hyodeoxycholic acid (5β-cholanic acid-3α,6α-diol), and a placebo.

No specific diet was given during this third study, except that one patient, E. G., was studied while hospitalized and was given more food that she could eat, the quantity of food consumed each day being recorded. Each patient received 1200 mg. of each bile acid, given daily in three divided doses prepared as described for the study reported in Table 1. The bile acids were used for six days of seven. The patients ranked the various pills in the order of increasing effectiveness and this order was used to score and evaluate the trial. The patients are listed in Table 2.

TABLE 2

| Patient's initials | Sex | Age (yrs.) | Weight (lbs.) |
|---|---|---|---|
| C. C | F | 48 | 281 |
| C. D | M | 28 | 330 |
| E. G | F | 25 | 314 |
| J. L | F | 30 | 228 |
| C. B | M | 35 | 418 |

Cholic acid produced no effect distinguishable from the placebo. On the other hand, chenodeoxycholic acid reduced appetite in three of the five patients and was significantly more effective than cholic acid ($P<.05$) when compared by the Student's "$t$" test, wherein P is an indication of statistical significance and measures the probability of obtaining like data from a putative population in which the acids would be of equal effect. Patient E. G.'s food intake rose sharply after termination of the chenodeoxycholic acid treatment and she reported that her appetite had increased.

Hyodeoxycholic acid and lithocholic acid produced an effect intermediate between cholic and chenodeoxycholic acids.

Blood test results on patient E. G. are representative of the tests on other patients and showed no changes resulting from treatment with bile acids. These results are summarized in Table 3.

TABLE 3

| Bile acid | Caloric intake | WBC | BUN | Bilirubin | SGPT | Ca | Cholesterol | K |
|---|---|---|---|---|---|---|---|---|
| Lithocholic | *4,446±106 | 10,400 | 20 | 0.1 | 20 | 9.4 | 154 | 4.9 |
| Chenodeoxycholic | 4,633±129 | 7,700 | 17 | 0.1 | | 9.4 | 183 | 4.8 |
| Placebo | 5,900±276 | 7,250 | 19 | 0.2 | 10 | 10.2 | 175 | 5.0 |
| Cholic | 5,679±192 | 8,500 | 17 | 0.2 | 20 | 9.5 | | 4.8 |
| Hyodeoxycholic | 6,094±163 | 9,350 | 18 | 0.2 | 10 | 10.0 | | 4.5 |

*Mean ± standard error of the mean for seven day period.
WBC—white blood count.
BUN—blood urea nitrogen.
SGPT—serum glutamic-pyruvic transaminase.
Ca—calcium.
K—potassium.

Eight toxicity studies were conducted on seven volunteer hospitalized patients as shown by Tables 4 and 5. (One patient C. D. was involved in two separate studies.) All eight studies included deoxycholic acid. Hyodeoxycholic acid, chenodeoxycholic acid, lithocholic acid and cholic acid were also fed to two of the patients and patient P. D. received the combinations of bile acids listed in Table 5 for intervals of 12 days each. All of the bile acids were administered orally in gelatin capsules.

TABLE 4

| Patient's initials | Age (yrs.) | Sex | Body weight (kg.) | Diet (calories) | Fat (percent) | Bile acid(s) | Daily dose (mg.) | Dose every 8 hrs. (mg.) | Duration (days) | PBI, gm. percent | RAI, percent | FBS | 17-OHCS (mg./day) | Uric acid |
|---|---|---|---|---|---|---|---|---|---|---|---|---|---|---|
| F. Cur | 20 | M | 166.8 | 1,260 | 20 | DC | 1,200 | 400 | 12 | 6.9 | 29 | 91 | 25.7 | 10.1 |
| V. S | 49 | M | 193.5 | 1,200 | 20 | DC | 1,200 | 400 | 12 | 6.3 | 22.4 | 86 | 13.1 | 9.2 |
| J. S | 24 | M | 131.6 | 1,600 | 40 | DC | 1,200 | 400 | 17 | 4.5 | 33.4 | 75 | 7.0 | 8.7 |
| C. D. (study 1) | 28 | M | 182.7 | 1,600 | 40 | DC | 1,200 | 400 | 25 | 5.2 | | | | |
| | | | | 2,500 | 40 | DC | 1,800 | 600 | 12 | | | | | |
| C. D. (study 2) | 28 | M | 167.8 | 1,600 | 50 | DC | 1,200 | 400 | 12 | 6.2 | | 73 | | 9.5 |
| | | | | 1,600 | 50 | DC | 1,200 | (a) | 6 | | | | | |
| | | | | 1,600 | 50 | DC | 1,800 | (b) | 4 | | | | | |
| | | | | 1,600 | 50 | DC | 1,200 | (a) | 24 | | | | | |
| F. Cog | 44 | F | 146.9 | 1,600 | 10 | DC | 1,200 | 400 | 9 | 6.1 | 35.8 | 98 | 25.4 | 7.4 |
| | | | | 1,600 | 50 | DC | 1,200 | 400 | 9 | | | | | |
| | | | | 1,600 | 50 | DC | 1,200 | (a) | 12 | | | | | |
| E. G | 25 | F | 131.2 | (c) | | DC | 1,200 | 400 | 6 | 4.8 | 26.0 | 82 | 10.1 | |
| | | | | (c) | | L | 1,200 | 400 | 6 | | | | | |
| | | | | (c) | | CDC | 1,200 | 400 | 6 | | | | | |
| | | | | (c) | | Pl | 1,200 | 400 | 6 | | | | | |
| | | | | (c) | | C | 1,200 | 400 | 6 | | | | | |
| | | | | (c) | | H | 1,200 | 400 | 6 | | | | | |
| P. D | 30 | F | 195.1 | 1,600 | 50 | (d) | (d) | (d) | (d) | 6.0 | 25.7 | 120 | 13.6 | 7.1 | a 200 mg. every 4 hours.
b 200 mg. every 2 hours, except at 2:00, 4:00, and 6:00 A.M.
c Ad lib.
d See Table 5.
PBI—protein-bound iodine.
RAI—radioactive iodine uptake.
FBS—fasting blood sugar.
17-OHCS—17-hydroxycorticosteroids.
DC—deoxycholic acid.
CDC—chenodeoxycholic acid.
H—hyodeoxycholic acid.
C—cholic acid.
L—lithocholic acid.
Pl—placebo (starch).

TABLE 5

| No. of 12-day interval | Bile acid(s) | Daily dose (mg.) |
|---|---|---|
| 1 | DC | 300 |
| 2 | DC | 600 |
| 3 | DC | 1,200 |
| 4 | C | 900 |
| 5 | C / DC | 600 / 300 |
| 6 | C / DC | 300 / 600 |
| 7 | DC | 900 |
| 8 | CDC / DC | 300 / 600 |
| 9 | CDC / DC | 600 / 300 |
| 10 | CDC | 900 |
| 11 | L / DC | 300 / 600 |
| 12 | L / DC | 600 / 300 |
| 13 | L | 900 |
| 14 | H | 900 |
| 15 | H / DC | 600 / 300 |
| 16 | H / DC | 300 / 600 |
| 17 | C | 900 |

All seven patients were grossly obese and showed the expected high values from the excretion of 17-hydroxycorticosteroids. Values for uric acid were high, but only P. D. had a fasting blood sugar greater than 100. Tests of thyroid function (PBI and RAI) were within normal limits.

All patients were fed liquid formula diets with varying quantities of fat added as cream.

In all eight studies deoxycholic acid produced an increase in the secretion of sodium and chloride in the stool but did not increase the excretion of fat, nitrogen or potassium. Feeding 1200 or 1800 mg. of this acid daily did not raise the level of bile acid in the blood above normal in C. D. (study 1) or C. D. (study 2). None of the other bile acids tested on P. D. and E. G. had any effect on the fecal excretion of sodium, potassium, nitrogen or fat. Pulse rate and body temperature were unaffected by any of the bile acids used in these toxicity studies.

Blood tests were conducted during all of the foregoing studies, including complete blood count, BUN, FBS, bilirubin, serum enzymes and electrolytes, creatinine, alkaline phosphatase, calcium, phosphorus, total protein, albumin/globulin ratio, iron, carotene, prothrombin time, uric acid, serum glutamic oxaloacetic transaminase, serum glutamic pyruvic transaminase, lactic dehydrogenase and xylose tolerance tests. No tests indicated abnormal results, except that the serum carotene was depressed to the lower limits of normal in all studies, and one elevation of serum bilirubin was noted (Table 5, interval 4) when chlolic acid was given. That elevation was not subsequently repeated when the same bile acid was given again (interval 17).

Peroral intestinal biopsies were also obtained with the Crosby capsule before and during these toxicity studies at two, four and six weeks and five months after the beginning of treatment in five of the seven patients. There was no histological change in the intestinal mucosa as a result of the giving of the bile acids.

Patients P. D. reported significant reduction in appetite during intervals 5, 6, 7, 8 and 9 (Table 5), which indicated not only that deoxychloci acid was effective when fed alone, but also that the feeding of combinations of the acids was likewise effective to suppress appetite.

Still further tests were carried out on male albino rats weighing 200 to 330 grams by intraperitoneal injections to obtain comparative measurements of the anorectic effects of a number of commercially available bile acids and their conjugates (sometimes referred to as "salts") and of d-amphetamine sulfate. The latter is a drug widely used for weight control but one producing undesirable stimulation of the central nervous system. The compounds tested were dissolved in a vehicle consisting of 0.1 normal aqueous solution of sodium hydroxide, diluted to 0.15 molar aqueous solution of sodium chloride and neutralized to pH 7.4. The results generally agreed with those obtained or suggested by the human trials and included statistical comparisons using the Student's "t" test.

Two groups of six animals each were used, one of which was a control group receiving injections of the vehicle at the same times as the experimental group. Since there was significant variability in the food intake from day to day within the same group of animals, all comparisons were made with the control group. The animals were used in rotations with none receiving more than two injections of experimental drug each week.

The animals were trained to eat their entire daily food intake within a six hour period throughout which food was made available. Tap water was available ad lib. All drugs were given 30 minutes before food was presented and the food intake for individual animals was measured each two hours during the six hours when it was available.

d-Amphetamine was given in doses of 0.3, 3.0 and 30.0 mg./kg. of body weight (i.e., 1.63, 16.3 and 163 micromoles of free base/kg.). The highest dose reduced food intake 95 percent over the entire six hour test period following injection, but characteristically the acute anorectic effect had subsided by the next day. The dose of 3.0 mg./kg. reduced food intake only 18 percent over the entire six hour test period following injection. Although it produced a 91 percent reduction of food intake during the first two hours, a higher than normal food intake was noted in the second and third two-hour intervals. Also, at the intermediate and highest dose levels some increase in motor activity was observed.

The doses of bile acid and conjugates were lower than the corresponding doses of amphetamine, i.e., 1, 10 and 100 micromoles/kg. Most of the bile acids and bile salts caused lethargy shortly after the highest doses were injected, but this effect promptly wore off. The doses of 1 and 10 micromoles had little or no effect either on lethargy or on the inhibition of appetite.

As with the amphetamine, the highest doses of certain of the bile acids and their derivatives had an amorectic effect that was rapid in onset. However, in contrast to the amphetamine, the effect did not subside as quickly, even at the intermediate dose levels. This is illustrated by the case of a single injection of chenodeoxycholic acid that depressed food intake on three consecutive days by 46, 48 and 38 percent, respectively. Similar prolonged effectiveness was indicated for deoxycholic acid, glycochenodeoxycholic acid, taurochenodeoxycholic acid and taurodeoxycholic acid.

The effectiveness of the tested bile acids and their derivatives is summarized in Table 6.

Cholic acid had a small effect, but neither its taurine nor its glycine conjugates had any effect. Lithocholic acid had a small but short-lasting effect on appetite, but its taurine conjugate did not.

Hyodeoxycholic acid was effective in one experiment but not in a second one. When the hydroxyl groups were oxidized to keto groups the compound produced had no effect on appetite.

Introduction of a double bond at the five position, and a 3-$\beta$-hydroxyl group produced a compound having an anorexigenic effect but one not significantly different from the control animals.

Two experiments on rats were carried out to test five bile acids with respect to actual weight gain when the compounds were administered over a period of four weeks or more. The bile acids were added to a semisynthetic diet in an amount of 1.5 mg. of acid per gram of diet, this being the sole source of food. The acids tested were deoxycholic, chenodeoxycholic, cholic, lithocholic, and hyodeoxycholic acid.

During 26 days of feeding the rate of weight gain was slowed in all groups receiving bile acid, and none of the bile acids had a significantly greater effect than any of the others.

At the end of the feeding period each animal in all groups was autopsied and pieces of tissue were fixed for histological examination, and blood was drawn for laboratory tests.

Blood urea nitrogen, serum glutamic oxaloacetic transaminase, bilirubin and creatinine were not affected by the treatment. Carotene levels were undetectable in any animal. Protein electrophoresis of the serum and electrophoresis for lipoproteins revealed normal patterns in all

TABLE 6

| Name | Test No. | R1 | R2 | R3 | R4 | R5 | 6-hr. food intake (percent of control) |
|---|---|---|---|---|---|---|---|
| Lithocholic | | $\alpha$-OH | H | H | H | OH | [1] 71 |
| | | $\alpha$-OH | H | H | H | (t) | 84 |
| Hyodeoxycholic | 1 | $\alpha$-OH | $\alpha$-OH | H | H | OH | 90 |
| | 2 | $\alpha$-OH | $\alpha$-OH | H | | OH | [2] 60 |
| Chenodeoxycholic | 1 | $\alpha$-OH | H | $\alpha$-OH | H | OH | [3] 55 |
| | 2 | $\alpha$-OH | H | $\alpha$-OH | H | OH | [1] 34 |
| | | $\alpha$-OH | H | $\alpha$-OH | H | (t) | [2] 49 |
| | | $\alpha$-OH | H | $\alpha$-OH | H | (g) | [2] 39 |
| | | $\alpha$-OH | H | $\alpha$-OH | H | OCH$_3$ | 100 |
| | | $\alpha$-OH | H | (ac) | H | OH | 103 |
| | | $\alpha$-OH | H | (ac) | H | OCH$_3$ | 94 |
| | | (ac) | H | (ac) | H | OCH$_3$ | 84 |
| Ursodeoxycholic | | $\alpha$-OH | H | $\beta$-OH | H | OH | [1] 54 |
| Deoxycholic | | $\alpha$-OH | H | H | $\alpha$-OH | OH | [3] 34 |
| | | $\alpha$-OH | H | H | $\alpha$-OH | (t) | [3] 51 |
| | | $\alpha$-OH | H | H | $\alpha$-OH | (g) | [1] 52 |
| | | $\alpha$-OH | H | H | $\alpha$-OH | OCH$_3$ | 100 |
| Cholic | | $\alpha$-OH | H | $\alpha$-OH | $\alpha$-OH | OH | [3] 70 |
| | | $\alpha$-OH | H | $\alpha$-OH | $\alpha$-OH | (t) | 98 |
| | | $\alpha$-OH | H | $\alpha$-OH | $\alpha$-OH | (g) | 88 |
| Ketocholanic | | =O | =O | H | H | OH | 100 |
| $\Delta^5$-cholenic | 1 | $\beta$-OH | H | H | H | OH | 76 |
| | 2 | $\beta$-OH | H | H | H | OCH$_3$ | [3] 72 |
| | | (ac) | H | (ac) | =O | OCH$_3$ | [1] 62 |
| | 1 | OH | H | OH | OH | (24) | [1] 66 |
| | 2 | OH | H | OH | OH | (24) | 83 |

[1] P<.01
[2] P<.001
[3] P<.05
(t) —NH—CH$_2$—CH$_2$—SO$_3^-$ (tauro-).
(g) —NH—CH$_2$—COO$^-$ (glyco-).

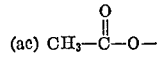

(24) CH$_2$OH at 24 position.

Chenodeoxycholic acid and deoxycholic acid are shown by the table to be highly effective in reducing appetite, and the taurine and glycine conjugates of the former are possibly even more potent than the free bile acid, while the taurine derivative of the latter also effectively inhibits appetite. On the other hand, when the 24 carboxyl group in deoxycholic acid was esterified to produce methyldeoxycholate, the compound produced had no effect on appetite. Ursodeoxycholic acid was also effective.

animals except those receiving hydeoxycholic acid. These rats showed an increase in the gamma globulin and an increase in the oil O red staining material at the origin of the lipoprotein electrophoresis strips.

Histological examination of the intestine revealed no changes.

As a result of the foregoing trials, tests and experiments, it is believed that useful methods have been discovered for the treatment of obesity in humans by administration of bile acids and certain derivatives and combinations thereof.

I claim:
1. A method of reducing body weight in a human through reduction in the intake of food, which consists in oral administration to a human host, in an amount between approximately 0.8 and 1.8 grams per day of a compound selected from the group consisting of deoxycholic acid, taurodeoxycholic acid, glycodeoxycholic acid, chenodeoxycholic acid, taurochenodeoxycholic acid, and glycochenodeoxycholic acid.

2. A method for reducing obesity in a human through sustained reduction in the intake of food, which consists in administering to a human host with the daily diet from 1.2 to 1.8 grams per day of a compound selected from the group consisting of deoxycholic acid, taurodeoxycholic acid, glycodeoxycholic acid, chenodeoxycholic acid, taurochenodeoxycholic acid, and glycochenodeoxycholic acid.

References Cited
UNITED STATES PATENTS

| | | | |
|---|---|---|---|
| 3,001,986 | 9/1961 | Burtner et al. | 260—239.5 |
| 3,153,615 | 10/1964 | Bosshardt et al. | 424—238 |
| 3,180,794 | 4/1965 | Antonides | 424—238 |

STANLEY J. FRIEDMAN, Primary Examiner

F. E. WADDELL, Assistant Examiner

PO-1050
(5/69)

UNITED STATES PATENT OFFICE
CERTIFICATE OF CORRECTION

Patent No. 3,591,687          Dated July 6, 1971

Inventor(s) George A. Bray

It is certified that error appears in the above-identified patent and that said Letters Patent are hereby corrected as shown below:

Column 2, line 60, "expectedly" should read --unexpectedly--.

Column 5 and 6, Table 4, the number "1200" under column heading "Diet (calories)" should read --1260--;

the number "7.0" under column heading "17-OHCS" should read --7.1--.

Column 6, line 45, "deoxychloci" should read --deoxycholic--.

Column 7, line 22, "amorectic" should read --anorectic--;

Table 6, for hyodeoxycholic Test No. 2, column R4 should read --H--.

Signed and sealed this 21st day of December 1971.

(SEAL)
Attest:

EDWARD M. FLETCHER, JR.      ROBERT GOTTSCHALK
Attesting Officer              Acting Commissioner of Patents